Figure 1:
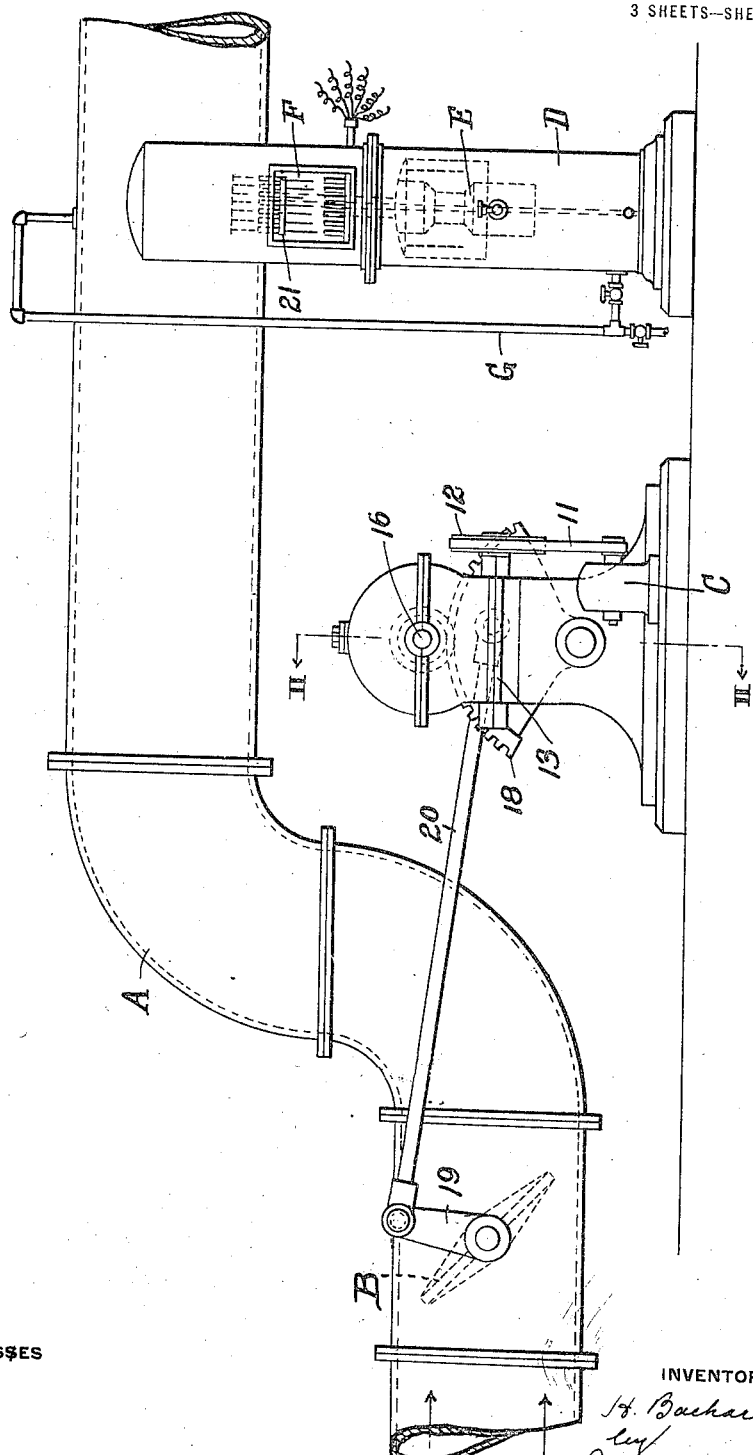

H. BACHARACH.
PRESSURE REGULATING APPARATUS.
APPLICATION FILED APR. 3, 1918.

1,299,106.

Patented Apr. 1, 1919.
3 SHEETS—SHEET 1.

WITNESSES

INVENTOR
H. Bacharach
by James C. Bradley
atty.

H. BACHARACH.
PRESSURE REGULATING APPARATUS.
APPLICATION FILED APR. 3, 1918.
1,299,106.
Patented Apr. 1, 1919.
3 SHEETS—SHEET 2.
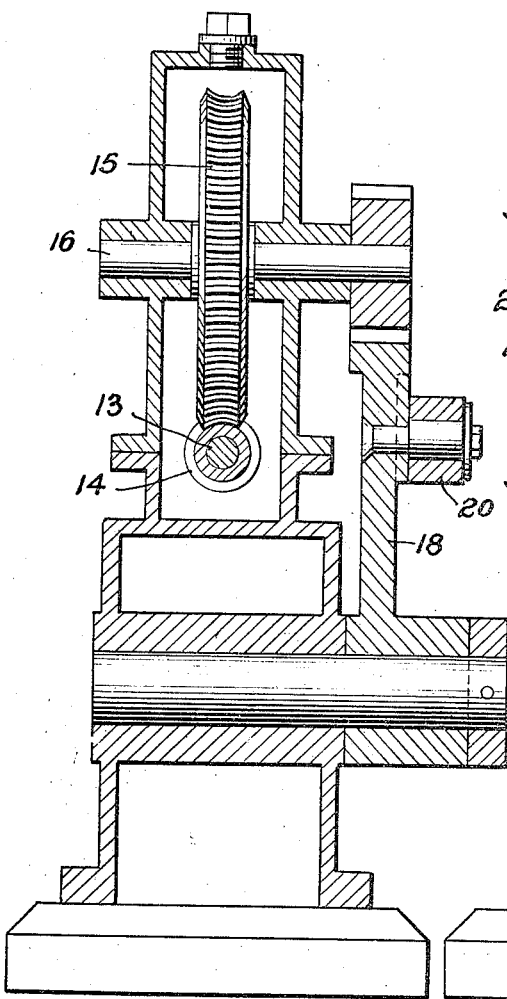
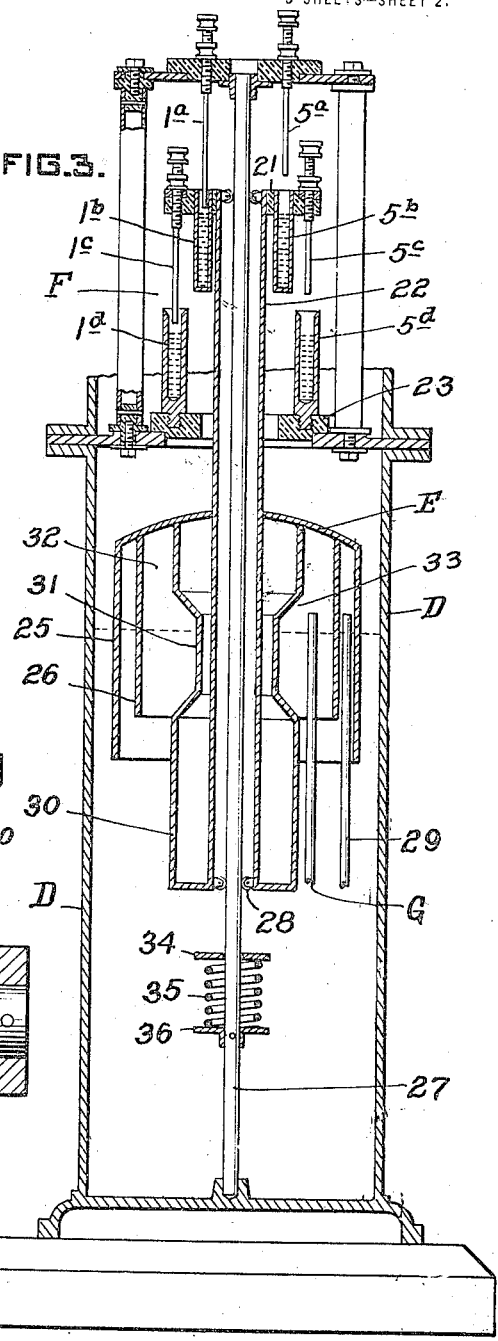

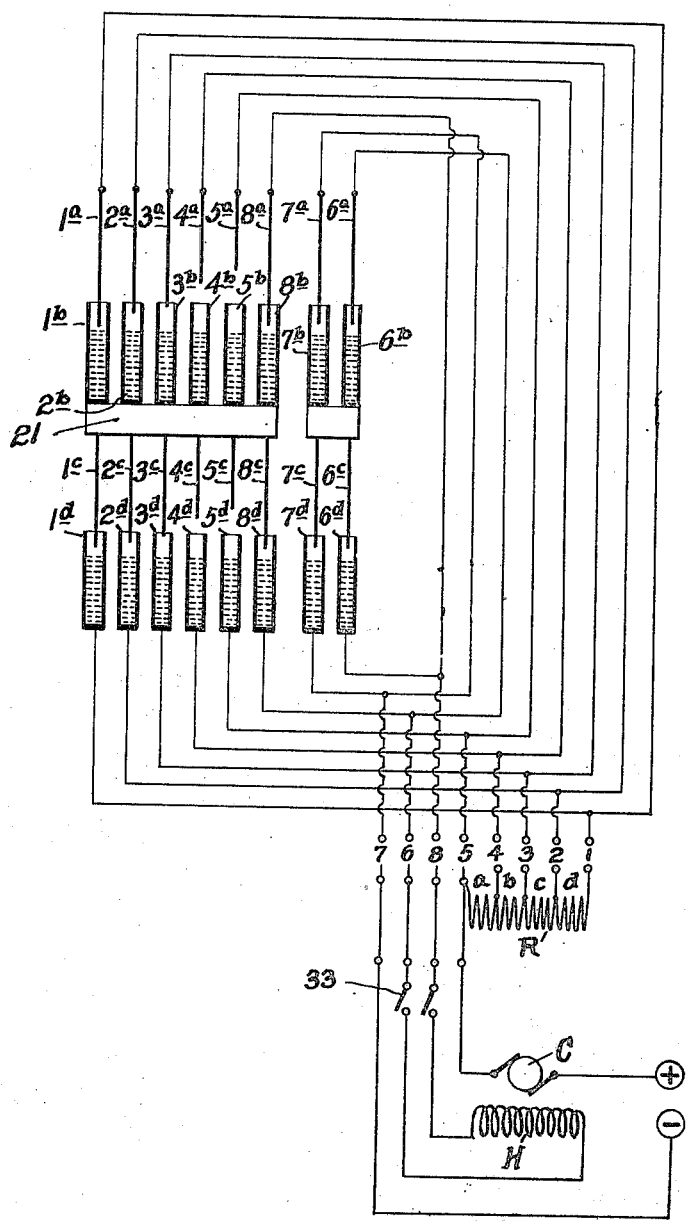

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, OF PITTSBURGH, PENNSYLVANIA, A CORPORATION OF PENNSYLVANIA.

PRESSURE-REGULATING APPARATUS.

1,299,106.            Specification of Letters Patent.        Patented Apr. 1, 1919.

Application filed April 3, 1918. Serial No. 226,378.

*To all whom it may concern:*

Be it known that I, HERMAN BACHARACH, a citizen of the United States, residing at Pittsburgh, in the county of Allegheny and State of Pennsylvania, have invented certain new and useful Improvements in Pressure-Regulating Apparatus, of which the following is a specification.

The invention relates to a pressure regulator for gas mains wherein a motor in conjunction with a hydrostatic element is utilized to open and close a valve in the main; the hydrostatic element being preferably governed by the pressure on the up-stream or outlet side of the valve and such element governing the motor which controls the valve. The invention has for its primary objects the provision of the controlling means of the kind specified wherein, (I) an over-regulating of the valve is avoided, (II) a step by step change in the speed of the motor is secured, (III) an improved arrangement of contacts for introducing and cutting out the motor resistance is provided, (IV) a magnified movement of the float is secured, and (V) an over-travel of the float is prevented. One embodiment of the float is illustrated in the accompanying drawing wherein:

Figure 1 is a side elevation showing the general arrangement of the apparatus; Fig. 2 is a vertical section on an enlarged scale on the line II—II of Fig. 1; Fig. 3 is a vertical section on an enlarged scale through the float and switch; and Fig. 4 is a diagrammatic view showing the motor and switch connections.

Referring, first, to the general arrangement as shown in Fig. 1, the reference numeral A indicates the gas main in which is mounted the swinging control valve B; C is an electric motor operating the speed reducing mechanism interposed between the motor and the valve B and later described; D is the casing containing the float E and switch mechanism F for regulating the speed of the motor and its direction of movement; G is the connection from the main to the casing D for controlling position of the float dependent upon the pressure in the main A; H is the motor field (Fig. 4) and R is the resistance by means of which the speed of the motor is controlled.

The construction of the speed controlling mechanism will be seen by comparison of the section of Fig. 2 with Fig. 1. The motor C drives a belt (11) passing over a pulley wheel (12) carried on the worm shaft (13). The worm (14) on this shaft drives the worm wheel (15) mounted upon the shaft (16). The shaft (16) is provided with a spur gear (17) engaging a segmental gear (18), and the segmental gear (18) is connected to the crank arm (19) of the valve B by means of the connecting rod (20).

The switch mechanism is shown diagrammatically in Fig. 4 and will be briefly described before a detailed description of the construction as illustrated in Fig. 3. The control is secured by means of a series of connections, 1, 2, 3, 4, 5, 6, 7 and 8 which lead from the motor and the motor resistance to the various parts of the switch mechanism. The connection 1 runs both to the cup $1^d$ and the finger $1^a$. Similarly as to the connections 2, 3, 4 etc., and these numerals are located between pairs of binding posts indicated by the small circles, it being understood that opposing binding posts are electrically connected in the usual way. The switch mechanism includes a movable member (21) operated from the float as later described, such member carrying upon its upper side a series of cups, $1^b$, $2^b$, $3^b$, etc., and upon its lower side a plurality of depending contact fingers, $1^c$, $2^c$, $3^c$, etc., of varying length. Mounted in fixed position above the cups $1^b$, $2^b$, $3^b$, etc., is a set of depending contact fingers, $1^a$, $2^a$, $3^a$, etc., adapted to successively engage the liquid contained in the cups, such liquid being preferably mercury. Mounted below the movable switch member (21) is a series of cups, $1^d$, $2^d$, $3^d$, etc., also preferably filled with mercury and adapted to receive the depending fingers $1^c$, $2^c$, $3^c$, etc., when the switch member is lowered.

The cups $1^b$, $2^b$, $3^b$, $4^b$, $5^b$ and $8^b$ carried by the member (21) are electrically connected together as are also the cups $6^b$ and $7^b$, but the two latter cups are insulated from the set comprising the members $1^b$, $2^b$, $3^b$, $4^b$, $5^b$ and $8^b$. The contact members $1^a$, $2^a$, $3^a$, etc., are all insulated from each other. Similarly the set of contact fingers $1^c$, $2^c$, $3^c$, $4^c$, $5^c$ and $8^c$ are electrically connected but such set is insulated from the set $7^c$ and $6^c$. The cups $1^d$, $2^d$, $3^d$, etc., are all insulated from each other.

The particular method of the construction of the switch will be seen by reference to the upper portion of Fig. 3, from which it will be seen that the cups $1^b$, $2^b$ $3^b$, etc., carried by the member (21), are arranged around the supporting and moving tube (22) as the center. Similarly as to the contact members are fingers $1^c$, $2^c$, $3^c$, etc. The cups $1^d$, $2^d$, $3^d$, etc., are mounted in a fixed supporting frame (23) in position to receive the contact fingers $1^c$, $2^c$, $3^c$, etc. The construction of the frame-work which supports the switch mechanism upon the top of the float casing D will be readily apparent from an inspection of Fig. 3 and without a detailed description, the contact fingers being made adjustable vertically as shown.

The tube (22) which moves the movable switch member (21) is carried by a float E having the depending bell members (25) and (26) lying in the liquid of the float.

The float is guided in its vertical movement upon a rod (27) mounted in the casing, the friction rolls (28) being carried upon the interior of tube (22) engaging the rod. The position of the float in the liquid is controlled by means of the pressure supplied from the main through the pipe G, such pipe leading to the interior of the bell (26) above the surface of the liquid. A pipe (29) leads from the interior of the outer chamber and provides a vent for the escape of gas from both chambers and limits the upward movement of the float. The float is preferably provided with the central portion (30) of the shape illustrated having the varying cross section with the part (31) of less diameter than the parts lying above and below. This construction of float secures a varying magnification of the movement of the float. The area in the space (32) above the liquid is increased by the reduction of the part (31) so that the movement of the float for a given increase in pressure is magnified, the movement being greater when a larger liquid surface is exposed to pressure. The speed of movement of the float in either direction from the central portion will also decrease when the level of the liquid traverses the inclined portions of the central member (30).

As illustrated in Fig. 1, the valve B is shown at central position, at which time about half the cross section of the pipe opening is closed. When the valve B is in such a position (maintaining constant pressure) the switch is so designed that the switch member (21) is in the middle position illustrated in Fig. 4, so that the cups carried thereby are out of contact with the upper contact fingers $1^a$, $2^a$, $3^a$ etc., and at the same time the lower contact fingers $1^c$, $2^c$, $3^c$, etc., have not engaged the liquid in the fixed cups $1^d$, $2^d$, $3^d$, etc., therebeneath. At this time the motor will not operate in either direction.

If now the pressure on the outlet side of the valve B increases, the float will be moved up, successively bringing the liquid of the cups $1^b$, $2^b$ $3^b$, etc., into contact with the fingers $1^a$, $2^a$, $3^a$, etc., and gradually reducing the resistance. The first contact made is between the cups $1^b$, $8^b$, $7^b$ and $6^b$ respectively and the fingers $1^a$, $8^a$, $7^a$ and $6^a$, such fingers all being the same length. This will start the motor at its slowest speed and the circuit, starting with the positive (+) terminal of the motor will be as follows—motor C, resistance $a$, $b$, $c$, $d$, connection 1, finger $1^a$, cup $1^b$, cup $8^b$, finger $8^a$, connection 8, motor field H, connection 6, finger $6^a$, cup $6^b$, cup $7^b$, finger $7^a$, and connection 7 to the negative terminal (—) of the motor.

If the float moves up still further the contact finger $2^a$ is brought into contact with the liquid in the cup $2^b$ which results in cutting out the resistance $d$ and the speeding up of the motor. Under these conditions the circuit from the motor C will include the resistance $a$, $b$, and $c$, connection 2, finger $2^a$, etc., the circuit from this point on being similar to that described in the preceding paragraph. Similarly as the float and switch member (21) move up still further bringing the fingers $3^a$, $4^a$ and $5^a$ successively into their respective cups and successively cutting out the resistance sections $c$, $b$ and $a$. The motor is thus brought to its maximum speed as the pressure increases and the float and switch move away from their positions of rest.

If now, the pressure on the outlet side of the valve decreases, the float and the member (21) will move down and the first contact finger disengaged from its cup will be the shortest finger $5^a$. The disengagement of this finger will throw in the resistance $a$ since the current will then have to flow from the contact finger $4^a$ to the contact finger $8^a$. A still further downward movement of the member (21) will remove the finger $4^a$ from the cup $4^b$ and the resistance $b$ will also be thrown in as the current will then have to flow from the contact finger $3^a$ to the contact finger $8^a$. The contact fingers will thus be disengaged until only the finger $1^a$ remains in its cup, at which time all of the resistance is in and the speed of the motor is reduced to its lowest point. When the member (21) moves down still further the circuit will be entirely broken and the motor stopped, with the valve in its required position.

It will be seen from the foregoing that the switch arrangement is such that as the float and switch approach their normal position or position of rest the speed of the motor is gradually cut down, which method of operation has been found to be desirable and to reduce the tendency of over regulating such as occurs when the motor speed is relatively high when the parts reach their normal position and start to move away from such position. On the other hand, the speed of the motor increases as the valve approaches its extreme position, thus securing a quicker action of the valve at the time when such quick action is most necessary to compensate for a great increase in pressure.

The action of the switch on the movement of the member (21) from its position of rest or neutral position to its lower positions is similar to that above described. The contact fingers 1ᶜ and 8ᶜ first coming into contact with the liquid in the cups so that all the resistance is thrown in at such time and the current passes through the resistance sections $a$, $b$, $c$, $d$, connection 1, cup 1ᵈ, finger 1ᶜ, finger 8ᶜ, cup 8ᵈ, connection 6, field H, connection 8, cup 6ᵃ, finger 7ᶜ, cup 7ᵈ and connection 7 back to the negative terminal. At this time the direction of the motor is reversed, since the direction of current through the field H is reversed when the fingers 7ᶜ and 6ᶜ engage the cups 7ᵈ and 6ᵃ as compared with the condition when the current passes through the upper sets of fingers and cups 6ᵃ, 7ᵃ, 6ᵇ, 7ᵇ.

As the member (21) moves down still further the resistance sections $d$, $c$, $b$ and $a$, are successively cut out, thus causing an increase in the speed of the motor as the pressure approaches its extreme position. On the reverse movement of the switch member (21), the resistance is again thrown in step by step as heretofore described in connection with the upper portion of the switch mechanism, the functions and advantages being the same.

A limit switch is preferably employed as indicated at 33 (Fig. 4), which limit switch may be mechanically thrown open when the valve reaches an extreme position, such action being secured by proper connection to one of the moving parts of the apparatus. This switch may be closed by means of a spring or other means on the reverse movement of the parts from extreme position. Limit switches of this character are well known and any approved form may be employed.

The use of the shorter bell (26) in connection with the escape pipe (29) serves as a means for limiting the upward movement of the float since the pressure in the inner bell cannot increase after the edge of such bell rises above the surface of the liquid and permits an escape of pressure through the pipe (29). This is of advantage in connection with the switch since it limits the travel thereof after the contact fingers are all withdrawn from the cups. Other stop means might be employed to accomplish this purpose. On the downward movement of the float the compression of the gas above the liquid tends to provide a stop, or a positive stop may be provided in the form of a washer (34) supported on a spring (35) with the spring in turn mounted on a disk (36) secured against downward movement on the guide rod (27).

Pressure may be supplied from the conduit to control the float in various ways aside from the one shown as it is not necessary that the controlling pressure be supplied from the outlet side of the valve or that it be supplied entirely from one side of the valve, this being a matter of design depending upon requirements and conditions. The switch and float control are subject to wide variations in design without departing from the invention as defined in the claims.

It will be understood that the position of rest of the float and switch at which time the motor is stopped is that illustrated in Fig. 4, but that the valve B may occupy any number of positions of rest depending on the position of the valve required to give the desired pressure on the outlet side of the valve. In any case, any slight change in pressure will cause only a slow movement of the valve to a new position, while a great change will cause a rapid shift to provide the necessary regulation as quickly as possible. On the other hand, as the float moves back to a position of rest the speed of the motor is slowed down thus preventing any over regulation. The means for giving the speed of movement as above set forth is illustrated and described as being accomplished by means of an increased and decreased resistance for the motor, but other means might be employed, the invention contemplating any and all means, mechanical or electrical whereby the speed of movement of the valve is increased as the float moves from a position of rest, and whereby such speed of movement is decreased as the float approaches its position of rest.

I claim:

1. In combination in a pressure regulator for a gas conduit, a valve in the conduit, motor operating means for the valve, and controlling means for the motor governed by the pressure in the conduit whereby the speed of movement of the motor increases with increasing surplus pressure in the conduit or increasing deficiency of pressure therein.

2. In combination in a pressure regulator for a gas conduit, a valve in the conduit, a motor for operating the valve, and means controlled by pressure from the conduit whereby the speed of movement of the valve from one position of rest or equilibrium toward another such position is increased as the change in the controlling pressure is increased.

3. In combination in a pressure regulator for a gas conduit, a valve in the conduit, a motor for operating the valve, and means controlled by pressure from the conduit whereby the speed of movement of the valve from one position of rest or equilibrium toward another such position is increased as the change in the controlling pressure is increased and decreased as the valve approaches its new position of rest.

4. In combination in a pressure regulator for a gas conduit, a valve in the conduit, a motor for operating the valve, and means including a float controlled by pressure from the conduit whereby the speed of movement of the valve from one position of rest or equilibrium toward another such position is increased as the change in the controlling pressure is increased.

5. In combination in a pressure regulator for a gas conduit, a valve in the conduit, a motor for operating the valve, and means including a float controlled by pressure from the conduit whereby the speed of movement of the valve as it approaches a position of rest or equilibrium is decreased.

6. In combination in a pressure regulator for a gas conduit, a valve in the conduit, a motor for operating the valve, and means including a float controlled by pressure from the conduit whereby the speed of movement of the motor in moving the valve from one position of rest or equilibrium toward another such position is increased with an increasing change of pressure in the conduit, and decreased as the valve approaches its new position of rest or equilibrium and as the controlling pressure approaches normal.

7. In combination in a pressure regulator for a gas conduit, a valve in the conduit, an electric motor for operating the valve, resistance means for controlling the speed of movement of the motor, and means controlled by pressure from the conduit for throwing in and cutting out said resistance, said means being arranged to cut out resistance and cause an increase in the speed of the motor as the controlling pressure increases or decreases with respect to a predetermined pressure.

8. In combination in a pressure regulator for a gas conduit, a valve in the conduit, an electric motor for operating the valve, resistance means for controlling the speed of movement of the motor, and means controlled by pressure from the conduit for throwing in and cutting out said resistance, said means being arranged to cut out resistance and cause an increase in the speed of the motor as the controlling pressure increases or decreases with respect to a predetermined pressure and to throw in resistance as the controlling pressure approaches said predetermined pressure.

9. In combination in a pressure regulator for a gas conduit, a valve in the conduit, an electric motor for operating the valve back and forth from its positions of rest or equilibrium, resistance means therefor, and means operated by the pressure in the conduit and arranged, upon an increasing change in pressure, to throw in said resistance in steps to cause the motor to operate at a step by step increasing speed as the valve is moved from one of its positions of rest, and to cut out said resistance in steps to cause the motor to operate at a step by step decreasing speed as the valve approaches another position of rest.

10. In combination in a pressure regulator for a gas conduit, a valve in the conduit, an electric motor for moving the valve to and from its positions of rest or equilibrium, resistance means therefor, and means operated by the pressure in the conduit and arranged, upon an increasing change in pressure, to cut out said resistance in steps to cause the motor to operate at a step by step increasing speed as the valve is moved away from its positions of rest.

11. In combination in a gas pressure regulator, a valve in the conduit, an electric motor for operating the valve, a float whose vertical position is governed by the pressure in the conduit, a resistance for the motor, and a switch operated by the float for cutting out said resistance step by step as the float moves away from normal position, or cut off position, throwing in the resistance step by step as the float approaches the normal position, and cutting off the supply of current entirely at said normal position.

12. In combination in a gas pressure regulator, a valve in the conduit, an electric motor for operating the valve, a float whose vertical position is governed by the pressure in the conduit, a resistance for the motor, and a switch operated by the float for cutting out said resistance step by step as the float moves in one direction from normal or cut off position to an extreme position, and throwing the resistance in step by step as the float moves from said extreme position to normal position, the said switch causing the reversal of the movement of the motor when the float moves from one side of normal position to the other.

13. In combination in a gas pressure regulator, a valve in the conduit, an electric motor for operating the valve, a float whose vertical position is governed by the pressure on the outlet side of the valve, a resistance for the motor, and a movable contact member operated by the float and carrying on one side a plurality of contact cups and on the other side a plurality of contact fingers of varying length, a set of fixed contact cups for receiving said fingers and a set of fixed contact fingers of varying length adapted to engage the first mentioned contact cups, the said cups and fingers being arranged to throw in said resistance step by step as the float moves in one direction from normal position and to cut out said resistance step by step as the float moves back from extreme position to normal position, and being arranged to cause the reversal of the movement of the motor as the float moves from one side of normal position to the other.

14. In combination in a gas pressure regulator for a gas conduit, a valve in the conduit, operating means for the valve and controlling means for the operating means comprising a bell float having a hollow central portion of two diameters, the part of less diameter lying normally in the liquid carrying the float and the part of greater diameter lying above and below the surface of the liquid.

15. In a gas regulator, a governing bell float, having a hollow central portion of two diameters, the part of less diameter lying normally in the liquid carrying the float and the part of greater diameter lying above the surface of the liquid.

16. The combination with a gas main provided with a regulating valve and an operating motor, of a switch for controlling the operation of the motor, and a bell float for controlling the operation of the switch, said float comprising an inner bell member and an outer bell member of greater depth than the inner member, a supply passage leading from the gas main to the chamber inside the inner member, and a vent from the chamber between the inner and outer members whereby the upward movement of the float is limited and the corresponding movement of the switch limited.

HERMAN BACHARACH.